United States Patent [19]

Sugie et al.

[11] Patent Number: 4,629,778
[45] Date of Patent: Dec. 16, 1986

[54] POLY(P-PHENYLENE SULFIDE) FILM AND PROCESS FOR PRODUCTION THEREOF

[75] Inventors: Toshinori Sugie, Takaishi; Fumihiro Kobata, Izumi; Takashi Kawamura, Urawa, all of Japan

[73] Assignee: Dainippon Ink and Chemicals, Inc., Tokyo, Japan

[21] Appl. No.: 816,312

[22] Filed: Jan. 6, 1986

Related U.S. Application Data

[63] Continuation-in-part of Ser. No. 694,500, Jan. 25, 1985, abandoned, which is a continuation of Ser. No. 495,824, May 18, 1983, abandoned.

[30] Foreign Application Priority Data

May 20, 1982 [JP] Japan ..................... 57-85293
May 25, 1982 [JP] Japan ..................... 57-87246
May 31, 1982 [JP] Japan ..................... 57-91382
Jul. 6, 1982 [JP] Japan ..................... 57-117498

[51] Int. Cl.$^4$ ............................................. C08G 75/14
[52] U.S. Cl. ................................ 528/388; 264/331.11
[58] Field of Search ..................... 528/388; 264/331.11

[56] References Cited

U.S. PATENT DOCUMENTS 4,286,018 8/1981 Asakura et al. ..................... 428/332

Primary Examiner—Melvyn I. Marquis
Attorney, Agent, or Firm—Sherman and Shalloway

[57] ABSTRACT

A biaxially oriented crystalline poly(p-phenylene sulfide) film wherein said polymer contains at least 90 mole % of recurring units of the formula

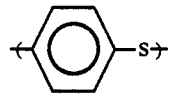

and has a melt viscosity of at least 0.12 dl/g and when said film is heat-treated at 270° C. for 10 minutes under relaxation and then stretched at 23° C. at a rate of 200%/min., its tensile strength, stress at 5% stretch and elongation show a percent retention of at least 60%, at least 80%, and 80 to 120%, respectively, based on these properties of the same film which has been stretched under said conditions without the heat-treatment; and a process for producing a crystalline poly(p-phenylene sulfide) film, which comprises heat-treating a biaxially oriented amorphous poly(p-phenylene sulfide) film at a temperature in the range of from 3° C. above its melting point measured by a differential scanning calorimeter to 350° C. at a constant length or under tension or in a moderate relaxed condition.

24 Claims, No Drawings

POLY(P-PHENYLENE SULFIDE) FILM AND PROCESS FOR PRODUCTION THEREOF

This application is a continuation-in-part application of Ser. No. 694,500 filed on Jan. 25, 1985, which was a continuation application of Ser. No. 495,824 filed on May 18, 1983 both now abandoned.

This invention relates to a poly(p-phenylene sulfide) film, and a process for production thereof. More specifically, this invention relates to a poly(p-phenylene sulfide) film having excellent heat deterioration resistance, mechanical properties and dimensional stability, and a process for production thereof.

Polyethylene terephthalate (PET for short) films have found extensive use in various fields as insulation films, base films for magnetic tapes, photographic base films and packaging films by taking advantage of their good mechnical properties, dimensional stability, electrical properties, transparency, chemical resistance, etc. The PET films, however, have low heat resistance, and even with heat-resistant type PET films, the temperature at which they can be used continuously is only 130° C. at the highest. Furthermore, since the PET films have a melting point of as low as about 260° C., they cannot permit application of electronic component parts which is effected by soldering at about 260° C.

Polyimide films have already been marketed as films having excellent heat resistance, and have found applications as aerospace and aircraft materials and high-grade electrical insulating films. Their uses and quantities have been broadened and increased year by year because of the importance of energy saving and of the need for smaller sizes, lighter weights and higher performances of various industrial machines. The polyimide films, however, have the defect that because they are produced by the solution film-forming method, the productivity is poor and the cost of production is high.

In an attempt to provide a film having better heat resistance than the PET films by a melt-molding technique with good productivity, Japanese Laid-Open Patent Publication No. 142275/1979 proposed a poly(p-phenylene sulfide) film. The poly(p-phenylene sulfide) film has better chemical resistance and heat resistance than the PET films and good mechanical properties, and its properties are well balanced. Since, however, poly(p-phenylene sulfide) has a slow speed of crystallization, one heat-treatment (heat-setting) operation at a temperature below $T_m$ (the melting point measured by a differential scanning calorimeter) which is usually carried out gives a poly(p-phenylene sulfide) film having a low degree of crystallization, a high heat shrinkage, poor dimensional stability, a low strength retention at high temperatures, low heat deterioration resistance, and insufficient solderability. To remove this defect, the heat-treatment should be performed for a long period of time, and this is industrially disadvantageous.

In order to solve this problem, Japanese Laid-Open Patent Publication No. 34967/1980 suggested a method in which the heat-treatment is carried out in two steps. According to this method, the temperature at which the second heat-treatment is carried out is lower than the temperature in the first heat-treatment. The time required for the second heat-treatment is more than 1 minute as shown in an example, and the total heat-treating time is very long. For this reason, this method does not prove to be entirely satisfactory.

With the foregoing background, the present inventors have made extensive investigations, and found that by performing heat-treatment under specified conditions for a short period of time, there can be obtained a poly(p-phenylene sulfide) film which has a high degree of crystallization, a low heat shrinkage, good dimensional stability, a high strength retention at high temperatures, excellent heat deterioration resistance and good solderability and which undergoes little degradation in properties even when it is once heated to a temperature near Tm.

Thus, according to this invention, there is provided a biaxially oriented crystalline poly(p-phenylene sulfide) film, said polymer containing at least 90 mole % of recurring units of the formula

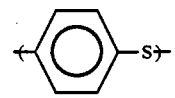

and having a solution viscosity of at least 0.12 dl/g; characterized in that when a sample having a size of, for example, 10 mm wide and 100–150 mm long, cut away from said film longitudinally and transversely respectively, is heat-treated at 270° C. for 10 minutes under relaxation and then stretched at 23° C. at a rate of 200 %/min., its tensile strength, stress at 5% stretch and elongation show a percent retention of at least 60%, at least 80%, and 80 to 120%, respectively, based on these properties of the same film sample which has been stretched under said conditions without the heat-treatment.

The present invention also provides a process for producing a biaxially oriented film of poly(p-phenylene sulfide), which comprises heat-treating a biaxially oriented poly(p-phenylene sulfide) film at a temperature in the range of from 3° C. above the Tm (the melting point measured by a differential scanning calorimeter) of the film to 350° C. with or without pre-heating it at a temperature of 150 to 350° C., and when said preheating is not carried out, optionally heat-treating the film further at a temperature of 150 to 350° C.

The poly(p-phenylene sulfide) used as a main component of the film of this invention is a polymer at least 90 mole % of which is composed of structural units of the formula

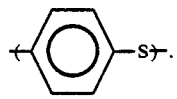

If the proportion of these recurring units is less than 90 mole %, the crystallinity of the polymer is reduced, and its heat resistance and mechanical properties are degraded. Its dimensional stability is also adversely affected. The poly(p-phenylene sulfide) used in this invention may contain less than 10 mole % of a metal linkage an ether linkage

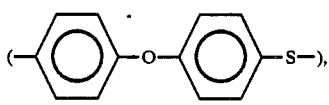

a biphenyl linkage

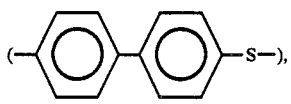

a naphthalene linkage

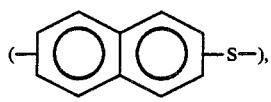

a sulfone linkage

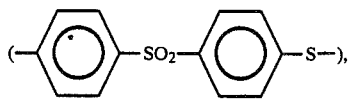

a substituted phenylene sulfide linkage

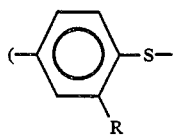

wherein R represents alkyl, nitro, phenyl, alkoxy, sulfone, halogen, carboxyl, metal carboxylate, etc.), a trifunctional phenylene sulfide linkage

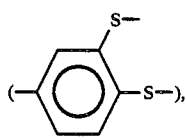

etc.

The poly(p-phenylene sulfide) is produced by a method which comprises sulfiding an aromatic dihalogen compound, a method which comprises de-salting a thiophenol salt, etc. For industrial operation, the most preferred method is to polycondense a p-dihalobenzene such as p-dichlorobenzene and sodium sulfide in an amide type polar solvent such as N-methylpyrrolidone.

The polymer constituting the film of this invention has a solution viscosity, measured at 206° C. in α-chloronaphthalene in a concentration of 0.4 g/100 ml, of at least 0.12 dl/g, preferably 0.12 to 1.0 dl/g. To obtain poly(p-phenylene sulfide) having such a solution viscosity, the following three methods, for example, can be used. A first method is to add about 10 to 150 mole %, based on the monomer, of an alkali metal or alkaline earth metal carboxylate such as lithium acetate, sodium acetate, calcium acetate, sodium benzoate and lithium benzoate during polymerization, thereby increasing the molecular weight of the resulting polymer. A second method is to use a trifunctional monomer such as 1,2,4-trichlorobenzene in addition to a difunctional monomer such as p-dichlorobenzene during polymerization whereby some crosslinked structure is introduced into the polymer and thus its solution viscosity is increased. The second method is used mainly in combination with the first method. In the second method, the proportion of the trifunctional monomer based on the main monomer is not more than 10 mole %, preferably not more than 1 % mole %.

A third method comprises exposing a polymer of a low solution viscosity to air at a temperature of from 200° C. to the melting point of the polymer to accelerate its oxidative crosslinking, thereby increasing the solution viscosity of the polymer. This method can sometimes be used advantageously in combination with the first method. But it is not desirable to use this method for oxidatively crosslinking a polymer having too low a solution viscosity immediately after polymerization. For example, when a polymer having a solution viscosity of 0.10 dl/g is oxidatively crosslinked to form a polymer having a solution viscosity of at least 0.30 dl/g, the resulting polymer can scarcely be stretched.

The second and third methods are preferably used to introduce a moderate proportion of a crosslinked structure into the polymer as a raw material for the film of this invention. But if too large a proportion of a crosslinked structure is introduced by these methods, the polymer shows rubbery elasticity during melting and stretching. As a result, only a film having poor flatness is obtained or the resulting film has poor stretchability. Thus, in many cases, the film intended by this invention cannot be obtained.

The polymer used in this invention may include additives such as a lubricant, antioxidant, ultraviolet absorber, plasticizer or coloring agent. Polymers or inorganic fillers may also be incorporated into it in amounts which do not affect the object of this invention.

The biaxially oriented crystalline poly(p-phenylene sulfide) film of this invention is obtained by heat-treating a biaxially oriented amorphous poly(p-phenylene sulfide) film obtained by conventional methods, thereby to crystallize it. The crystalline poly(p-phenylene sulfide) film generally has a degree of crystallization of 20 to 48%, and a density of 1.341 to 1.371 g/cm$^3$.

When the biaxially oriented crystalline poly(p-phenylene sulfide) film of this invention is heat-treated at 270° C. for 10 minutes under relaxation and then stretched at 23° C. at a rate of 200 %/min., its tensile strength, elongation and stress at 5% stretch show a retention of at least 60%, preferably 60 to 110%; 80 to 120%, preferably 80 to 110%; and at least 80%, preferably 90 to 120%, respectively, based on the tensile strength, elongation and stress at 5% stretch of the same film which has been stretched at 23° C. at a rate of 200%/min. without the heat-treatment. The size of the film sample to be heat-treated at 270° C. for 10 minutes as above is not particularly restricted, but generally a sample measuring 10 mm longitudinally and 100 to 150 mm transversely is suitable.

Preferably, the biaxially oriented crystalline poly(p-phenylene sulfide) film of this invention has a shrinkage of not more than 2% when dipped in a solder bath at 260° C. for 30 seconds.

The thickness of the film of this invention is properly selected depending upon the end use. Usually, it is about 0.5 to 1000 μm.

The aforesaid biaxially oriented amorphous poly(p-phenylene sulfide) film is produced, for example, as follows:

Poly(p-phenylene sulfide) is molded into a sheet or film by an extruder, a press, etc., and then quenched by using liquid nitrogen, water, a roll, etc. whereby its density becomes not more than 1.334 g/cm$^3$ and a nearly amorphous unstretched film is obtained. When crystallization of the unstretched film proceeds, the crystal grains reduce its stretchability and make the film liable to break during stretching. The temperature at which the unstretched film is stretched differs somewhat depending upon the molecular weight or components of the polymer. Usually, the stretching temperature is desirably near the glass transition point of the polymer. More specifically, it is 80° to 120° C., preferably 90° to 110° C. The stretching may be carried out by usual methods such as a roll method, a tenter method or a tubular method. The suitable stretch ratio is 2.5 to 7.0 times, preferably 3.0 to 5.5 times, in view of the properties of the resulting film and productivity. The film may be stretched biaxially at the same time or successively.

The thickness of the amorphous biaxially oriented poly(p-phenylene sulfide) film is not particularly restricted. Generally, its suitable thickness is 0.5 to 1000 μm.

The amorphous biaxially oriented poly(p-phenylene sulfide) film so obtained is heat-treated at a temperature $T_1$ ranging from 3° C. above Tm to 350° C., preferably from 3° C. above Tm to 330° C., for a period of usually not more than 120 seconds, preferably 0.1–60 seconds in order to increase its degree of crystallization without a loss of transparency (the main heat-treatment). Tm denotes the melting point of the film immediately after biaxial stretching but before the heat-treatment which is measured by a differential scanning calorimeter (to be referred to as DSC). This is the so-called second transition point.

When the heat-treatment is carried out at a temperature exceeding 350° C., the film becomes molten and cannot retain its shape even if the heat-treating time is shortened. At a temperature in the range of from 3° C. above Tm to 350° C., the film can be heat-set without making it molten by properly adjusting the heat-treating time within 120 seconds. Furthermore, its density and dimensional stability under heat become higher than in the case of heat-treatment at a temperature below Tm. The heat-treatment may be carried out under moderate limited shrinkage in the longitudinal and transverse directions, or at constant length or under tension. If, however, the heat-treatment is carried out in a condition which will cause a shrinkage of at least 25%, the flatness of the film is reduced. Furthermore, if the heat-treatment is carried out at a stretch of at least 25%, the heat shrinkage of the resulting film becomes high.

Generally, crystalline polymer films typified by a PET film are heat-treated at a temperature below the melting point of polymer. To heat-treat the crystalline polymer film at a temperature at least 3° C. above the melting point of the polymer as in the present invention is quite a new method of heat-setting.

The film subjected to the main heat-treatment as described above sometimes shows a high heat shrinkage when measured by, for example, a method involving raising the temperature gradually from room temperature, or a method comprising contacting the film directly with a high temperature atmosphere. Such a film is in some cases not desirable as a material to be used under heat.

The heat shrinkage of such a film after the main heat-treatment can be reduced, and its dimensional stability under heat can be increased, by moderately heating it at a temperature $T_2$ in the range of 150° C. to 345° C., preferably 200° to 330° C., for a period of 0.01 seconds to 10 minutes, preferably 0.1 to 120 seconds (after heat-treatment). The after heat-treatment is carried out under a restricted shrinkage or stretch of preferably not more than 25%, more preferably not more than 15%, in one or two directions, or at constant length.

Furthermore, before the main heat-treatment at temperature $T_1$, the biaxially oriented film may be heat-treated at a temperature $T_0$ of 150° C. to Tm° C., preferably 250° to Tm° C., for a period of usually not more than 120 seconds, preferably 0.1 to 60 seconds (preliminary heat-treatment). For the properties of the film, it is preferred to perform the preliminary heat-treatment at constant length or under tension or in a moderate relaxed condition.

In the heat-treatment in accordance with the present invention, the treating effect becomes greater as the treating temperature becomes higher within the above-specified range. When the preliminary heat-treatment at temperature $T_0$ or the after heat-treatment at temperature $T_2$ is carried out before or after the main heat-treatment, it is not necessary to prescribe the heat-treating temperature at high points in all of these treating steps. From the viewpoint of energy efficiency, a high treating temperature may be used in only one of the main heat-treatment and the preliminary and after heat-treatment steps. To treat the film at the same temperature for more than 10 minutes is not effective, and it is effective to perform the heat-treatments at diffeent temperatures. Good results are obtained by adjusting the temperature $T_1$ of the main heat-treatment to a point at least 5° C. higher than the temperature $T_0$ or $T_2$ of the preliminary or after heat-treatment, respectively.

When the main heat-treatment following the preliminary heat-treatment is carried out at constant film length, the temperature $T_1$ of the main heat-treatment is preferably at least 5° C., especially at least 10° C., higher than the temperature $T_0$ of the preliminary heat-treatment. This temperature adjustment, however, is not necessary when the after heat-treatment is carried out under restricted shrinkage or under stretch. In an especially preferred embodiment, the preliminary heat-treatment is carried out at constant length, and the after heat-treatment is carried out under restricted shrinkage. In this case, it is also preferred that the temperature $T_2$ of the after heat-treatment is equal to the temperature $T_0$ of the preliminary heat-treatment. The film so heat-treated may, as required, be further heat-treated at constant length at 150 to 345° C.

The biaxially oriented poly(phenylene sulfide) film before heat-treatment is produced by general stretching methods, for example a successive biaxial stretching method consisting of a combination of longitudinal stretching by a roll unit composed of a low-speed roll and a high-speed roll and transverse stretching by a tenter, a simultaneous biaxial stretching method by a tenter, and a simultaneous biaxial stretching method by means of an inflation type device. Any of these methods can be used, but the first-mentioned method is industrially most preferred because of its high productivity. The successive biaxial stretching is not limited to longitudinal and transverse stretchings, or transverse and longitudinal stretchings, but may also be conveniently carried out, for example, longitudinally, transversely and then longitudinally; transversely, longitudinally and then transversely; and longitudinally, longitudinally and then transversely.

The heat-treatment in this invention is effected by bringing the biaxially oriented film before heat-treatment into contact with a heated gas, liquid or solid heat medium. Or radiant heat from an infrared heater may also be utilized. Irradiation of ultrasonic waves or high frequency waves is also possible. In the present invention, the "temperature" of heat-treatment denotes the temperature of the heated medium and the "heat-treating time" denotes the time during which the stretched film is kept in contact with the heated medium. In the case of using an infrared heater, ultrasonic waves, high-frequency waves, etc., the heat-treating temperature denotes the temperature of the film, and the heat-treating time is the time required for the treatment.

When the film of this invention is to be produced by a flat die method, the stretching step and the heat-treatment step are generally carried out in a heated chamber. In the heated chamber, the thin film is heated evenly with good precision so as not to break it. A small heating chamber is provided for each of the steps, and when the heat-treatment is carried out in two or more stages, the heating chamber is preferably divided according to the number of stages. The biaxially oriented film before the heat-treatment is pinched at both transverse ends by clips and treated continuously. After leaving the heating chamber, the film is cooled, and wound up. Between the individual stretching steps, or between the stretching step and the heat-treatment step, such a step as cooling may be interposed.

Examples of the gaseous heat medium include air, nitrogen, helium, oxygen, hydrogen, argon, steam, and vapors of low-boiling organic materials. Air, nitrogen, helium, oxygen, and steam are preferred. When the gaseous heat medium is used, the biaxially oriented film before the heat-treatment can be heat-treated by placing it in an atmosphere, for example a current, of the gaseous heat medium.

The liquid heat medium may, for example, be hot water or an organic compound which is liquid and inert at the heat-treating temperature. Examples of such an organic compound are diphenyl ether, diphenyl, diphenyl oxide, ethyl diphenyl, terphenyl, hydrogenated terphenyl, diphenyl oxide, triethylene glycol, dodecane, and dodecanol.

Heat-treatment in the liquid heat medium is carried out by dipping the biaxially oriented film before heat-treatment in the heat medium.

The solid heat medium may, for example, be a metal, wood, or ceramic. Heat-treatment by the solid heat medium is carried out by contacting the solid heat medium with one or both surfaces of the biaxially oriented film before heat-treatment. Examples of the metal are stainless steel, iron, gold, silver, copper, brass, tin, nickel, cobalt, zinc, aluminum, and alloys of these. Examples of the ceramic are titanium oxide, zirconia, alumina, and silicon nitride.

The biaxially oriented crystalline poly(p-phenylene sulfide) film of this invention has excellent dimensional stability, strength retention at high temperature, heat resistance, solderability and electrical properties. It also has excellent long-term heat resistance, and is rated as class F according to IEC standards.

The film of this invention is most suitable as an electrical insulation film or a magnetic recording film whose dimensional change, even slight, cannot be ignored. For example, it is useful as a flexible printed circuit board, a base film for magnetic tapes, a film for condensers, etc. It is also useful as a heat-resistant insulating film material for various motors, refrigerator motors and vehicle motors of smaller sizes or lighter weights, an insulating jacketing material for general cables or high voltage or ultrahigh voltage cables, an insulating material for various transformers, and a diaphragm of batteries. The film of this invention can also be used for packaging, agriculture, photography, decoration and copying and as adhesive tapes, building materials, and magnetic discs. For example, it can be used as films for packing foodstuffs, sundries, and medicines, films for agricultural house cultivation, base films for adhesive or pressure-sensitive tapes having an adhesive coated on one or both surfaces, photographic films, radiographic films, 8-mm motion picture films, tracing films, base films for magnetic discs, vibratory films of speakers, or base materials for hot stamping. It can also be used as a composite material by laminating it to other films, metals or paper.

The following non-limitative Examples illustrate the present invention more specifically. The various properties in these examples were measured by the following methods.

(1) Glass transition temperature and Tm

The glass transition temperature of an unstretched amorphous film or sheet, and the Tm of the film immediately after biaxial stretching were measured in a customary manner by using a differential scanning calorimeter (DSC).

(2) Density and the degree of crystallization (Xe)

The density was measured by a density gradient tube using an aqueous solution of lithium bromide. The degree of crystallization (Xe) was calculated by a density method using the measured density. More specifically, the Xe is generally obtained from the following equation (A).

$$\frac{1}{d} = \frac{Xe}{d_{cr}} + \frac{1 - Xe}{d_{am}} \tag{A}$$

wherein d, $d_{cr}$ and $d_{am}$ are the density of the sample, the density of the crystalline phase, and the density of the amorphous phase, respectively.

In the above equation, $d_{cr}=1.430$ g/cm$^3$ and $d_{am}=1.320$ g/cm$^3$, which are described in Eur. Poly. J., 7, 1127 (1971), were used.

(3) Heat shrinkage

A sample, 5 mm in width and 100 mm in length, was cut out from the heat-treated film, and two indicator lines were provided longitudinally at an interval of 50 mm. The sample was maintained for 10 minutes under relaxation in a dryer kept at a predetermined temperature. The interval between the indicator lines of the film was then measured, and the heat shrinkage of the film was calculated.

(4) Tensile test

A sample, 5 mm wide (TD) and 100-150 mm long (MD), was cut out from the heat-treated film, and heat-treated for 10 minutes under relaxation in a dryer kept at a predetermined temperature. Then, the break strength (tensile strength), elongation and F-5 value of the sample were measured, and the percent retentions of these values based on these properties of the film sample measured before the heat-treatment also were calculated. In the tensile test, the sample was held by clips so as to provide a sample length of 50 mm in a Tensilon tensile tester, and the sample was stretched at a rate of 200%/min. At this time, the temperature of the sample was maintained at 23° C.

The F-5 value denotes the tensile stress when the elongation of the film in the tensile tester was 5%.

(5) Percent relaxation

This denotes the percentage of shrinkage of the film in the second heat-treatment.

water, and a powdery polymer was taken out. The polymer was repeatedly washed with water and acetone, and then dried at 120° C. for 3 hours to give a white powder. The final polymer had a solution viscosity [η], determined at 206° C. for its solution in α-chloronaphthalene in a concentration of 0.4 g/100 ml, of 0.30 dl/g.

The polymer was press-formed at 320° C., and quenched in water to give a transparent, nearly amorphous, unstretched sheet having a density of 1.321 g/cm$^3$ and a thickness of 405 microns. The amorphous sheet had a glass transition temperature, measured by DSC at a temperature elevating rate of 20° C./min., of 89° C.

The amorphous sheet was biaxially stretched at 94° C. both in the machine direction (at a stretch ratio of 3.5) and the transverse direction (at a stretch ratio of 3.5). The stretched film had a Tm, measured by DSC at a temperature elevating rate of 20° C./min., of 284° C.

The stretched film was heat-treated in air at constant length at the temperatures and times shown in Table 1.

For comparison, the stretched film was heat-treated at a temperature below Tm under the same conditions as above.

The various properties of these films are shown in Table 1.

TABLE 1

| Run No. | | 1 | 2 | 3 | 4(*) | 5(*) | 6(*) | 7(*) |
|---|---|---|---|---|---|---|---|---|
| Conditions for the main heat treatment | Temperature (°C.) | 290 | 300 | 305 | 220 | 240 | 250 | 284 |
| | Time (seconds) | 20 | 15 | 8 | 30 | 30 | 30 | 20 |
| Density (g/cm$^3$) | | 1.361 | 1.365 | 1.363 | 1.342 | 1.345 | 1.348 | 1.356 |
| Degree of crystallization (%) | | 39 | 43 | 41 | 21 | 24 | 27 | 34 |
| Heat shrinkage (%) at | 150° C. | 0.0 | 0.0 | 0.0 | 0.51 | 0.49 | 0.43 | 0.20 |
| | 200° C. | 0.41 | 0.37 | 0.38 | 2.1 | 1.8 | 1.7 | 0.60 |
| | 250° C. | 1.1 | 0.95 | 0.99 | 5.3 | 5.1 | 4.8 | 1.5 |
| Film dipped for 30 second in a solder bath at 260° C. | Shape | No change | No change | No change | Creases and unevenness occurred | Creases and unevenness occurred | Creases and unevenness occurred | Unevenness occurred |
| | Shrinkage (%) | 1.0 | 1.0 | 0.9 | 18 | 16 | 14.8 | 2.1 |
| Percent retention (%) | Tensile strength | 75 | 80 | 77 | 35 | 40 | 41 | 58 |
| | F-5 value | 87 | 90 | 90 | 64 | 63 | 65 | 87 |
| | Elongation | 117 | 110 | 110 | 118 | 115 | 121 | 127 |

Note: The asterisked runs were for comparison.

EXAMPLE 1

A 5-liter autoclave was charged with 1.8 kg of N-methylpyrrolidone, 0.5 kg of sodium sulfide (purity 59.6%), 0.6 kg of sodium benzoate and 1.6g of sodium hydroxide. They were heated to 200° C. in a stream of nitrogen and dehydrated to a dehydration ratio of 53%. The system was cooled to 160° C., and 0.6 kg of p-dichlorobenzene was added. The pressure of the inside of the autoclave was increased to 4 kg/cm$^2$ by nitrogen. The temperature was raised to 250° C. while controlling the rate of temperature elevation due to the heat of polymerization. With stirring, the polymerization was carried out at this temperature for 3 hours. The reaction mixture was cooled, and then the pressure of the autoclave was released. The contents were poured into

EXAMPLE 2

The amorphous sheet obtained in Example 1 was biaxially stretched successively at 95° C. at a stretch ratio of 3.5 (MD) and 4.0 (TD). The Tm of the stretched film, measured as in Example 1, was 286° C.

The film was heat-treated in air at constant length at the temperatures and for the times shown in Table 2.

For comparison, the film was heat-treated at temperatures below Tm.

The properties of the heat-treated films are summarized in Table 2.

The results given in Table 2 show that the films obtained in accordance with this invention had good dimensional stability under heating.

TABLE 2

| Run No. | | 1 | 2 | 3 | 4(*) | 5(*) | 6(*) | 7(*) | 8(*) | 9 |
|---|---|---|---|---|---|---|---|---|---|---|
| Conditions for the main heat treatment | Temperature (°C.) | 290 | 300 | 310 | 200 | 250 | 260 | 270 | 286 | 293 |
| | Time (seconds) | 30 | 10 | 7 | 30 | 30 | 30 | 30 | 20 | 20 |
| Density (g/cm$^3$) | | 1.360 | 1.361 | 1.360 | 1.340 | 1.343 | 1.349 | 1.352 | 1.356 | 1.360 |
| Degree of crystallization (%) | | 38 | 39 | 38 | 19 | 22 | 28 | 29 | 34 | 38 |
| Heat shrinkage (%) at | 150° C. | 0.0 | 0.0 | 0.0 | 0.71 | 0.52 | 0.50 | 0.35 | 0.0 | 0.0 |
| | 200° C. | 0.45 | 0.33 | 0.51 | 2.5 | 2.3 | 1.9 | 1.5 | 0.8 | 0.45 |
| | 250° C. | 1.1 | 0.8 | 1.2 | 7.8 | 7.3 | 6.9 | 5.0 | 2.1 | 1.0 |
| Film dipped for 30 | Shape | No | No | No | Creases | Creases | Creases | Creases | Un- | No |

TABLE 2-continued

| Run No. | | 1 | 2 | 3 | 4(*) | 5(*) | 6(*) | 7(*) | 8(*) | 9 |
|---|---|---|---|---|---|---|---|---|---|---|
| second in a solder bath at 260° C. | | change | change | change | and unevenness occurred | and unevenness occurred | and unevenness occurred | and unevenness occurred | evenness occurred | change |
| Percent retention (%) | Shrinkage (%) | 0.8 | 0.8 | 0.8 | 21 | 15.0 | 13.0 | 3.4 | 2.1 | 0.8 |
| | Tensile strength | 78 | 79 | 86 | 32 | 41 | 50 | 59 | 60 | 78 |
| | F-5 value | 90 | 85 | 94 | 65 | 68 | 69 | 69 | 69 | 91 |
| | Elongation | 111 | 106 | 110 | 100 | 129 | 130 | 130 | 125 | 110 |

Note: The asterisked runs were for comparison.

EXAMPLE 3

A 5-liter autoclave was charged with 1.8 kg of N-methylpyrrolidone, 0.5 kg of sodium sulfide (purity 59.6%), 0.6 kg of sodium benzoate and 1.6 g of sodium hydroxide. They were heated to 200° C. in a stream of nitrogen and dehydrated to a dehydration ratio of 55%. The system was cooled to 160° C., and 0.6 kg of p-dichlorobenzene was introduced. The autoclave was then sealed up, and the inside of the autoclave was pressurized with nitrogen to 4 kg/cm$^2$. The mixture was heated to 250° C. while controlling the rate of temperature elevation due to the heat of polymerization. The polymerization was carried out at this temperature for 5 hours with stirring. The pressure of the inside of the autoclave increased to 10 kg/cm$^2$. The reaction mixture was cooled, and the pressure was released. The contents were poured into water, and a particulate polymer was taken out. It was repeatedly washed with water and acetone, and dried at 120° C. for 3 hours to give a white particulate polymer. The final polymer had a solution viscosity, measured as in Example 1, of 0.30 dl/g.

The polymer was press-formed at 300° C. and quenched in ice water to give a transparent, nearly amorphous sheet having a thickness of 400 microns and a denity of 1.321 g/cm$^3$.

The amorphous sheet was simultaneously stretched biaxially at 94° C. at a stretch ratio of 3.5 (MD) and 3.5 (TD). The Tm of this film was found to be 285° C. Then, the stretched film was preliminarily heat-treated in air at constant length at 270° C. for 20 seconds to obtain a colorless transparent film having a thickness of about 33 microns. The film was further heat-treated in air under the conditions shown in Table 3.

It is seen from Table 3 that the films in accordance with this invention have a low heat shrinkage, and excellent dimensional stability under heating, and did not change in shape even when dipped in a solder bath at 260° C. for 30 seconds.

TABLE 3

| Run No. | | 1(*) | 2 | 3 | 4 | 5 | 6(*) | 7(*) | 8(*) | 9(*) |
|---|---|---|---|---|---|---|---|---|---|---|
| Conditions for the preliminary heat-treatment | Temperature (°C.) | | | | | 270 | | | | |
| | Time (seconds) | | | | | 20 | | | | |
| | State of the film | | | | | Constant length | | | | |
| Conditions for the main heat treatment | Temperature (°C.) | 270 | 300 | 330 | 300 | 300 | 200 | 230 | 240 | 285 |
| | Time (seconds) | 20 | 10 | 7 | 15 | 15 | 20 | 10 | 7 | 10 |
| | Relaxation ratio (%) | 10 | 5 | 5 | 0(*1) | −5(*2) | 10 | 5 | 5 | 5 |
| Heat shrinkage (%) at | 150° C. | 0.0 | 0.0 | 0.0 | 0.0 | 0.0 | 0.02 | 0.01 | 0.01 | 0.0 |
| | 200° C. | 0.05 | 0.02 | 0.02 | 0.02 | 0.02 | 0.31 | 0.25 | 0.23 | 0.05 |
| | 250° C. | 0.40 | 0.30 | 0.28 | 0.30 | 0.30 | 2.5 | 3.1 | 2.3 | 0.40 |
| Film dipped for 30 seconds in a solder bath at 260° C. | Shape | No change | No change | No change | No change | No change | The surface became uneven | Crease occurred | Crease occurred | The surface became uneven. |
| Percent rentention (%) | Shrinkage (%) | 1.2 | 0.6 | 0.4 | 0.8 | 1.0 | 56 | 4.3 | 3.4 | 2.2 |
| | Tensile strength | 65 | 70 | 75 | 74 | 77 | 45 | 50 | 59 | 65 |
| | F-5 value | 82 | 85 | 87 | 88 | 86 | 65 | 68 | 70 | 83 |
| | Elongation | 123 | 118 | 119 | 116 | 118 | 135 | 130 | 126 | 124 |

(*1): Treated at constant length
(*2): Treated under 5% stretch
The asterisked runs were for comparison.

EXAMPLE 4

A 5-liter autoclave was charged with 1.8 kg of N-methylpyrrolidone, 0.5 kg of sodium sulfide 2.7-hydrate, 0.6 kg of sodium benzoate and 1.6 g of sodium hydroxide. They were heated gradually with stirring to 220° C. over the course of about 2 hours to distill off 105 ml of water. The reaction mixture was cooled to 170° C., and then 0.6 kg of p-dichlorobenzene and 0.4 kg of N-methylpyrrolidone were added. They were reacted at 220° C. for 2 hours, and then at 250° C. for 3 hours. After the polymerization, the pressure of the inside of the autoclave was 6.7 kg/cm$^2$. The reaction mixture was cooled, and filtered. The resulting solid was washed three times with hot water and then two times with acetone, and dried at 120° C. for 3 hours to give a grayish white particulate polymer. The polymer had an inherent viscosity [$\eta$], measured as in Example 1, of 0.31.

The polymer was press-formed at 310° C. and quenched in water to give a transparent unstretched sheet having a thickness of 400 microns and a density of 1.321 g/cm$^3$. It was nearly amorphous. The glass transition temperature of this sheet, measured by using DSC at a temperature elevating rate of 10° C./min., was 89° C.

The amorphous sheet was simultaneously stretched biaxially at 95° C. at a stretch ratio of 3.5 (MD) and 3.5 (TD). The Tm of the stretched film, measured by DSC at a temperature elevating rate of 10° C./min., was 287° C.

The film was heat-treated in air under the various conditions shown in Table 4, and the properties of the heat-treated films were measured. The results are shown in Table 4.

It is seen from Table 4 that the films of the invention have a low heat shrinkage, and even when heated to a temperature near Tm, their properties undergo little deterioration, thus showing good heat resistance.

Example 4, was 90° C. The amorphous unstretched sheet was successively stretched biaxially at 95° C. at a stretch ratio of 3.5 (MD) and 4.0 (TD). The Tm of the stretched film measured as in Example 4 was 281° C.

The stretched film was heat-treated in air under tension at 300° C. for 20 seconds, and then relaxed 5% at

TABLE 4

| Run No. | | 1 | 2 | 3 | 4 | 5 | 6 |
|---|---|---|---|---|---|---|---|
| Conditions for the main heat-treatment | Temperature (°C.) | 290 | 300 | 310 | 300 | 290 | 290 |
| | Time (seconds) | 20 | 15 | 10 | 15 | 20 | 20 |
| Conditions for the after heat-treatment | Temperature (°C.) | 250 | 250 | 250 | 300 | 300 | 300 |
| | Time (seconds) | 15 | 15 | 15 | 15 | 15 | 15 |
| | Relaxation ratio (%) | 5.0 | 5.0 | 5.0 | 5.0 | 5.0 | 5.0 |
| Properties of the film | Density (g/cm$^3$) | 1.360 | 1.362 | 1.363 | 1.367 | 1.366 | 1.361 |
| | Degree of crystallization (%) | 38 | 40 | 41 | 45 | 44 | 39 |
| | Heat shrinkage (%) | | | | | | |
| | 200° C. | 0.03 | 0.03 | 0.02 | 0.02 | 0.02 | 0.03 |
| | 250° C. | 0.7 | 0.5 | 0.3 | 0.3 | 0.3 | 0.4 |
| | 270° C. | 3.3 | 2.9 | 2.5 | 2.0 | 2.2 | 2.7 |
| | Film dipped for 30 seconds in a solder bath at 260° C. Shape | No change | No change | No change | No change | No change | No change |
| | Shrinkage (%) | 0.7 | 0.7 | 0.7 | 0.3 | 0.6 | 0.6 |
| | Percent retention (%) of tensile strength | | | | | | |
| | After the heat-treatment at 250° C. for 10 min. | 90 | 94 | 93 | 93 | 93 | 94 |
| | After the heat-treatment at 270° C. for 10 min. | 80 | 83 | 85 | 82 | 81 | 84 |
| | Percent rentention (%) of elongation | | | | | | |
| | After the heat-treatment at 250° C. for 10 min. | 105 | 101 | 101 | 102 | 103 | 101 |
| | After the heat-treatment at 270° C. for 10 min. | 114 | 112 | 109 | 110 | 109 | 108 |
| | Percent retention (%) of F-5 value | | | | | | |
| | After the heat-treatment at 250° C. for 10 min. | 90 | 93 | 96 | 95 | 96 | 95 |
| | After the heat-treatment at 270° C. for 10 min. | 89 | 91 | 94 | 94 | 95 | 94 |

| Run No. | | 7 | 8(*) | 9(*) | 10(*) | 11(*) |
|---|---|---|---|---|---|---|
| Conditions for the main heat-treatment | Temperature (°C.) | 300 | 240 | 250 | 260 | 287 |
| | Time (seconds) | 15 | 20 | 20 | 20 | 20 |
| Conditions for the after heat-treatment | Temperature (°C.) | 315 | 250 | 250 | 250 | 250 |
| | Time (seconds) | 10 | 15 | 15 | 15 | 15 |
| | Relaxation ratio (%) | 5.0 | 5.0 | 5.0 | 5.0 | 5.0 |
| Properties of the film | Density (g/cm$^3$) | 1.368 | 1.340 | 1.345 | 1.349 | 1.355 |
| | Degree of crystallization (%) | 46 | 19 | 24 | 28 | 34 |
| | Heat shrinkage (%) | | | | | |
| | 200° C. | 0.02 | 0.70 | 0.65 | 0.55 | 0.20 |
| | 250° C. | 0.3 | 9.6 | 8.2 | 7.4 | 0.9 |
| | 270° C. | 1.4 | 13.1 | 12.2 | 11.4 | 4.0 |
| | Film dipped for 30 seconds in a solder bath at 260° C. Shape | No change | Creases and unevenness occurred | Creases and unevenness occurred | Creases and unevenness occurred | The surface became uneven |
| | Shrinkage (%) | 0.2 | 13.1 | 11.4 | 11.2 | 2.1 |
| | Percent retention (%) of tensile strength | | | | | |
| | After the heat-treatment at 250° C. for 10 min. | 93 | 45 | 51 | 58 | 75 |
| | After the heat-treatment at 270° C. for 10 min. | 86 | 40 | 47 | 51 | 60 |
| | Percent rentention (%) of elongation | | | | | |
| | After the heat-treatment at 250° C. for 10 min. | 103 | 118 | 115 | 111 | 90 |
| | After the heat-treatment at 270° C. for 10 min. | 110 | 150 | 135 | 122 | 70 |
| | Percent retention (%) of F-5 value | | | | | |
| | After the heat-treatment at 250° C. for 10 min. | 95 | 85 | 86 | 88 | 105 |
| | After the heat-treatment at 270° C. for 10 min., | 96 | 81 | 83 | 84 | 124 |

Note: The asterisked runs were for comparison.

EXAMPLE 5

The same polymerization as in Example 4 was carried out except that 585 g of p-dichlorobenzene and 2.2 g of 4-trichlorobenzene were used as monomers. A grayish white particulate polymer was thus obtained. The polymer had an inherent viscosity [η], measured as in Example 1, of 0.45.

The polymer was press-formed at 310° C. and quenched in water to obtain a transparent unstretched sheet having a thickness of 400 microns and a density of 1.332 g/cm$^3$. The sheet was nearly amorphous. The glass transition temperature of this sheet, measured as in Example 4, was 90° C. The amorphous unstretched sheet was successively stretched biaxially at 95° C. at a stretch ratio of 3.5 (MD) and 4.0 (TD). The Tm of the stretched film measured as in Example 4 was 281° C.

The stretched film was heat-treated in air under tension at 300° C. for 20 seconds, and then relaxed 5% at 250° C. for 15 seconds.

For comparison, the stretched film was heat-treated in air under tension at 250° C. for 20 seconds, and then relaxed 5% at the same temperature for 15 seconds. The resulting film corresponds to Run No. 2(*) in Table 5. Heat treatment was performed as above except that the temperature of 250° C. was changed into 281° C. The thus obtained film corresponds to Run No. 3(*) in Table 5.

The properties of the heat-treated films were measured, and are shown in Table 5.

It is seen from Table 5 that the film of this invention has a low heat shrinkage and good heat resistance.

TABLE 5

| Run No. | 1 | 2(*) | 3(*) |
|---|---|---|---|
| Density (g/cm³) | 1.361 | 1.342 | 1.354 |
| Degree of crystallization (%) | 39 | 21 | 33 |
| Heat shrinkage (%) | | | |
| 200° C. | 0.02 | 0.8 | 0.03 |
| 250° C. | 0.53 | 6.5 | 1.6 |
| 270° C. | 3.1 | 14.1 | 5.0 |
| Film dipped in a solder bath at 260° C. for 30 seconds   Shape | No change | Creases and unevenness occurred | The surface became uneven |
| Shrinkage (%) | 0.6 | 11.3 | 2.1 |
| Percent retention (%) of tensile strength | | | |
| After the heat-treatment at 250° C. for 10 min. | 95 | 53 | 74 |
| After the heat-treatment at 270° C. for 10 min. | 86 | 49 | 58 |
| Percent retention (%) of elongation | | | |
| After the heat-treatment at 250° C. for 10 min. | 103 | 115 | 90 |
| After the heat-treatment at 270° C. for 10 min. | 113 | 145 | 71 |
| Percent retention (%) of F-5 value | | | |
| After the heat-treatment at 250° C. for 10 min. | 98 | 90 | 104 |
| After the heat-treatment at 270° C. for 10 min. | 95 | 85 | 125 |

Note: The asterisked run was for comparison.

EXAMPLE 6

A 5-liter autoclave was charged with 1.8 kg of N-methylpyrrolidone, 0.5 kg of sodium sulfide 2,7-hydrate, 0.6 kg of sodium benzoate and 1.6 g of sodium hydroxide, and these materials were gradually heated to 200° C. with stirring over the course of about 2 hours to distill off 105 ml of water. The reaction mixture was cooled to 170° C., and 0.6 kg of p-dichlorobenzene and 0.4 kg of N-methylpyrrolidone were added. The mixture was reacted at 220° C. for 2 hours and then at 250° C. for 3 hours. At the end of the polymerization, the pressure of the inside of the autoclave was 6.7 kg/cm². The reaction mixture was cooled and filtered. The solid was washed with hot water three times and then with acetone two times, and dried at 120° C. for 3 hours to give a grayish particulate polymer. The solution viscosity of the polymer, measured as in Example 1, was 0.29 dl/g.

The polymer was press-formed at 310° C. and quenched in water to give a transparent unstretched sheet having a thickness of 400 microns and a density of 1.321 g/cm³. It was nearly amorphous. The glass transition temperature of the amorphous sheet, measured by DSC at a temperature elevating rate of 10° C./min., was 90° C. The amorphous sheet was simultaneously stretched biaxially at a stretch ratio of 3.5 (MD) and 3.5 (TD). The Tm of the film, measured by DSC at a temperature elevating rate of 10° C./min., was 285° C.

The film was heat-treated in air at 295° C. for 20 seconds, and then relaxed 5% at 250° C. for 20 seconds. The final film had a thickness of 33 mirons and a density of 1.366 kg/cm³.

The tensile properties of the film were as follows:
Tensile strength (MD/TD): 23/22 (kg/mm²)
F-5 value (MD/TD): 11/11 (kg/mm²)
Elongation (MD/TD): 62/63 (%)

The film was left to stand for 10 minutes in a relaxed condition in air at 270° C., and its tensile properties were measured. The percent retentions of these properties were as follows:
Tensile strength retention (MD/TD): 85/83 (%)
F-5 value retention (MD/TD): 91/90 (%)
Elongation retention (MD/TD): 110/112 (%)

The heat shrinkages and solder heat resistance of the film before it was left to stand in a relaxed condition for 10 minutes at 270° C. were as shown in Table 6.

TABLE 6

| Items | Results |
|---|---|
| Heat shrinkage | |
| 150° C. | 0.00% |
| 220° C. | 0.05% |
| 250° C. | 0.5% |
| Solder heat resistance | |
| Shrinkage in one direction after dipping in a solder bath at 260° C. for 30 seconds | 0.8% |
| Shape after dipping in a solder bath at 260° C. for 5 minutes | No change |

The film has very good dimensional stability under heating, and is useful as a base film for a flexible printed circuit board.

COMPARATIVE EXAMPLE 1

The film used in Example 6 before heat-treatment was heat-treated in air at 250° C. for 20 seconds, and then relaxed 5% at the same temperature for 20 seconds. The tensile properties of the film were as follows:
Tensile strength (MD/TD): 20/22 (kg/mm²)
F-5 value (MD/TD): 10/10 (kg/mm²)
Elongation (MD/TD): 61/58 (%)

The film was left to stand in a relaxed condition in air at 270° C. for 10 minutes, and its tensile properties were measured. The percent retentions of these propeties were as follows:
Tensile strength retention (MD/TD): 47/51 (%)
F-5 value retention (MD/TD): 73/75 (%)
Elongation retention (MD/TD): 131/125 (%)

The heat shrinkages of the film and the solder heat resistance of the film before it was left to stand in a relaxed condition in air at 270° C. for 10 minutes were measured, and the results are shown in Table 7.

TABLE 7

| Item | Results |
|---|---|
| Heat shrinkage | |
| 150° C. | 0.05% |
| 220° C. | 2.1% |
| 250° C. | 8.3% |

TABLE 7-continued

| Item | Results |
|---|---|
| Solder heat resistance | |
| Shrinkage in one direction after dipping in a solder bath at 260° C. for 30 seconds | 11.3% |
| Shape after dipping in a solder bath at 260° C. for 5 minutes | Creases and surface unevenness occurred. |

EXAMPLE 7

The same polymerization as in Example 6 was carried out except that 585 g of p-dichlorobenzene and 2.1 g of 1,2,4-trichlorobenzene were used. A grayish white particulate polymer was obtained. This polymer had a solution viscosity, measured as in Example 1, of 0.42 dl/g.

The polymer was press-formed at 310° C. and quenched in water to give a transparent unstretched sheet having a thickness of 400 microns. It had a density of 1.322 g/cm$^3$ and was nearly amorphous. The glass transition temperature of this sheet, measured as in Example 6, was 91° C.

The amorphous unstretched sheet was simultaneously stretched biaxially at a stretch ratio of 3.5 (MD) and 3.5 (TD). The Tm of this film, measured as in Example 1, was 279° C. The stretched film was heat-treated in air at 305° C. for 20 seconds, and then relaxed 5% at 260° C. for 15 seconds. The final film had a thickness of about 33 microns and a density of 1.364 g/cm$^3$. The film had the following tensile properties.
Tensile strength (MD/TD): 19/20 (kg/mm$^2$)
F-5 value (MD/TD): 10/10 (kg/mm$^2$)
Elongation (MD/TD): 58/57 (%)

The film was left to stand in a relaxed condition in air at 270° C. for 10 minutes, and its tensile properties were measured. The percent retentions of these properties were as follows:
Tensile strength retention (MD/TD): 86/85 (%)
F-5 value retention (MD/TD): 95/93 (%)
Elongation retention (MD/TD): 109/111 (%)

The heat shrinkage and solder heat resistance of the film before it was left to stand in air at 270° C. for 10 minutes were measured. Its heat shrinkage at 250° C. was 0.6%. When it was dipped in a solder bath at 260° C. for 30 seconds, its shrinkage in one direction was 0.7%. It was found therefore that the film of this invention has very good dimensional stability under heating.

COMPARATIVE EXAMPLE 2

The film used in Example 7 before heat-treatment was heat-treated at constant length in air at 240° C. for 20 seconds, and then relaxed 5% at 250° C. for 15 seconds. The film had a density of 1.348 g/cm$^3$. The film had the following tensile properties.
Tensile strength (MD/TD): 17/18 (kg/mm$^2$)
F-5 value (MD/TD): 10/10 (kg/mm$^2$)
Elongation (MD/TD): 51/49 (%)

The film was left to stand in a relaxed condition in air at 270° C. for 10 minutes, and its properties were measured. The percent retentions of these properties were as follows:
Tensile strength retention (MD/TD): 53/51 (%)
F-5 value retention (MD/TD): 75/74 (%)
Elongation retention (MD/TD): 131/135 (%)

The heat shrinkage and solder heat resistance of the film before it was left to stand in a relaxed condition at 270° C. for 10 minutes were measured. It had a heat shrinkage at 250° C. of 9.3%. When it was dipped in a solder bath at 260° C. for 30 seconds, its shrinkage in one direction was 11%, and creases occurred in the film. This film has poor dimensional stability during heating, and was unsuitable as a base film for a flexible printed circuit board.

COMPARATIVE EXAMPLE 3

The film used in Example 7 before heat treatment was heat-treated at constant length in air at 279° C. for 15 seconds, and then relaxed 5% at 260° C. for 15 seconds The film had a density of 1.352 g/cm$^3$. The tensile properties of the film were as follows.
Tensile strength (MD/TD): 18/18 (kg/mm$^2$)
F-5 value (MD/TD): 10/10 (kg/mm$^2$)
Elongation (MD/TD): 52/50 (%)

The film was left to stand in a relaxed oondition in air at 270° C. for 10 minutes, and its properties were mesured. The percent retentions of these properties were as follows:
Tensile strength retention (MD/TD): 64/63 (%)
F-5 value retention (MD/TD): 74/75 (%)
Elongation retention (MD/TD): 124/125 (%)

The heat shrinkage and solder heat resistance of the film before it was left to stand in a relaxed condition at 270° C. for 10 minutes were measured. It had a heat shrinkage at 250° C. of 2.3%. When it was dipped in a solder bath at 260° C. for 30 seconds, its shrinkage in one direction was 2.3%, and the surface became uneven. The film has poor dimensional stability during heating, and was unsuitable as a base film for a flexible printed circuit board.

EXAMPLE 8

The amorphous sheet used in Example 1 was simultaneously stretched biaxially at 94° C. at a stretch ratio of 3.5 (MD) and 3.5 (TD). The Tm of the stretched film, measured as in Example 1, was 286° C. The film was heat-treated at constant length in each of the atmospheres and under the temperature conditions which are shown in Table 8. The densities, heat shrinkages, solder heat resistances and percent retentions of properties (after heating at 270° C. for 10 minutes) were measured, and are shown in Table 8.

The films in accordance with this invention have excellent dimensional stability under heating.

TABLE 8

| Run No. | | 1 | 2 | 3 | 4 |
|---|---|---|---|---|---|
| Conditions for the main treatment | Temperature (°C.) | 300 | 300 | 300 | 290 |
| | Time (sec.) | 15 | 15 | 15 | 20 |
| | Atmosphere | Nitrogen current | Oxygen current | Steam | Vapor of stoddard solvent |
| Density (g/cm$^3$) | | 1.363 | 1.360 | 1.364 | 1.361 |
| Heat shrinkage (%) | | | | | |
| 150° C. | | 0.0 | 0.0 | 0.0 | 0.0 |

TABLE 8-continued

| Run No. | | 1 | 2 | 3 | 4 |
|---|---|---|---|---|---|
| 200° C. | | 0.40 | 0.41 | 0.40 | 0.39 |
| 250° C. | | 1.0 | 1.1 | 1.0 | 0.9 |
| Film dipped in a solder bath at 260° C. for 30 seconds | Shape | No change | No change | No change | No change |
| | Shrinkage (%) | 1.0 | 1.1 | 0.8 | 0.9 |
| Percent retentions (%) | Tensile strength | 78 | 80 | 78 | 80 |
| | F-5 value | 88 | 87 | 86 | 88 |
| | Elongation | 112 | 115 | 114 | 117 | what is claimed is:

1. A biaxially oriented crystalline poly(p-phenylene sulfide) film wherein said polymer contains at least 90 mole % of recurring units of the formula

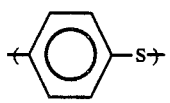

and has a melt viscosity of at least 0.12 dl/g and when said film is heat-treated at 270° C. for 10 minutes under relaxation and then stretched at 23° C. at a rate of 200%/min., its tensile strength, stress at 5% stretch and elongation show a percent retention of at least 60%, at least 80%, and 80 to 120%, respectively, based on these properties of the same film which has been stretched under said conditions without the heat-treatment.

2. The film of claim 1 wherein the polymer has a solution viscosity of 0.12 to 1.0 dl/g.

3. The film of claim 1 which has a percent retention of stress at 5% stretch of 80 to 110%.

4. The film of claim 1 which has a percent retention of elongation of 90 to 120%.

5. The film of claim 1 which has a shrinkage of not more than 2% when it is dipped in a solder bath at 260° C. for 30 seconds.

6. A process for producing a crystalline poly(p-phenylene sulfide) film, which comprises heat-treating a biaxially oriented amorphous poly(p-phenylene sulfide) film at a temperature in the range of from 3° C. above its melting point measured by a differential scanning calorimeter to 350° C. at a constant length or under tension or in a moderate relaxed condition.

7. A process for producing a crystalline poly(p-phenylene sulfide) film, which comprises heat-treating a biaxially oriented amorphous poly(p-phenylene sulfide) film at a temperature of main heat-treatment ranging from 3° C. above its melting point measured by a differential scanning calorimeter to 350° C. at a constant length or under tension or in a moderate relaxed condition, and then heat-treating the film at a temperature of after heat-treatment of 150° to 345° C. at a constant length or under tension or in a moderate relaxed condition, said temperature of main heat-treatment being at least 5° C. higher than said temperature of after heat-treatment.

8. A process for producing a crystalline poly(p-phenylene sulfide) film, which comprises heat-treating a biaxially oriented amorphous poly(p-phenylene sulfide) film at a temperature of preliminary heat-treatment of 150° to 345° C. at a constant length or under tension or in a moderate relaxed condition, and then heat-treating it at a main heat-treatment temperature in the range of from 3° C. above its melting point measured by a differential scanning calorimeter to 350° C., which is at least 5° C. higher than said temperature of preliminary heat-treatment, at a constant length or under tension or in a moderate relaxed condition.

9. The process of claim 6 wherein the heat-treatment is carried out for a period of not more than 120 seconds.

10. The process of claim 7 wherein the heat-treatment at the temperature of after heat-treatment is carried out for 0.01 second to 10 minutes.

11. The process of any one of claims 6 to 8 wherein the amorphous biaxially oriented poly(p-phenylene sulfide) film has a thickness of 0.5 to 1000 μm.

12. The process of any one of claims 6 to 8 wherein the heat-treatment is carried out in an atmosphere of air, nitrogen, helium, oxygen, hydrogen, argon, steam, a vapor of a lower-boiling organic compound, or a mixture thereof.

13. The process of any one of claims 6 to 8 wherein the heat-treatment is carried out by using hot water, an organic compound which is liquid and inert at the heat-treating temperature, a metal, wood or ceramic as a heat medium.

14. The process of claim 13 wherein the organic compound is diphenyl ether, diphenyl, diphenyl oxide, ethyl diphenyl, terphenyl, hydrogenated terphenyl, diphenylene oxide, triethylene glycol, dodecane or dodecanol.

15. The process of claim 13 wherein the metal is stainless steel, iron, gold, silver, copper, brass, tin, nickel, cobalt, zinc, lead, aluminum or an alloy of any one of these.

16. The process of claim 13 wherein the ceramic is titanium oxide, zirconia, alumina or silicon nitride.

17. The process of any one of claims 6 to 8 wherein the amorphous biaxially oriented poly(p-phenylene sulfide) film is under a restricted shrinkage or stretch of not more than 25%.

18. The process of any one of claims 6 to 8 wherein the biaxially oriented crystalline poly(p-phenylene sulfide) film is kept at constant length.

19. The process of claim 6 wherein the temperature is from 290° C. to 330° C.

20. The film of claim 1 having a degree of crystallization of 20 to 48% and a density of 1.341 to 1.371 g/cm³.

21. The process of claim 7 or 8 wherein the main heat-treatment is at a temperature of from 290° C. to 330° C.

22. The process of claim 6 wherein the heat-treating temperature is from 3° C. to 45° C. higher than the melting point.

23. The process of claim 7 or 8 wherein the main heat-treatment is at a temperature of from 3° to 45° C. above the melting point.

24. The process of claim 6 wherein the heat-treatment is carried out for a time of from 0.1 to 60 seconds.

* * * * *